Aug. 20, 1929.      H. BANY      1,725,696
AUTOMATIC CONTROL SYSTEM
Filed June 2, 1927
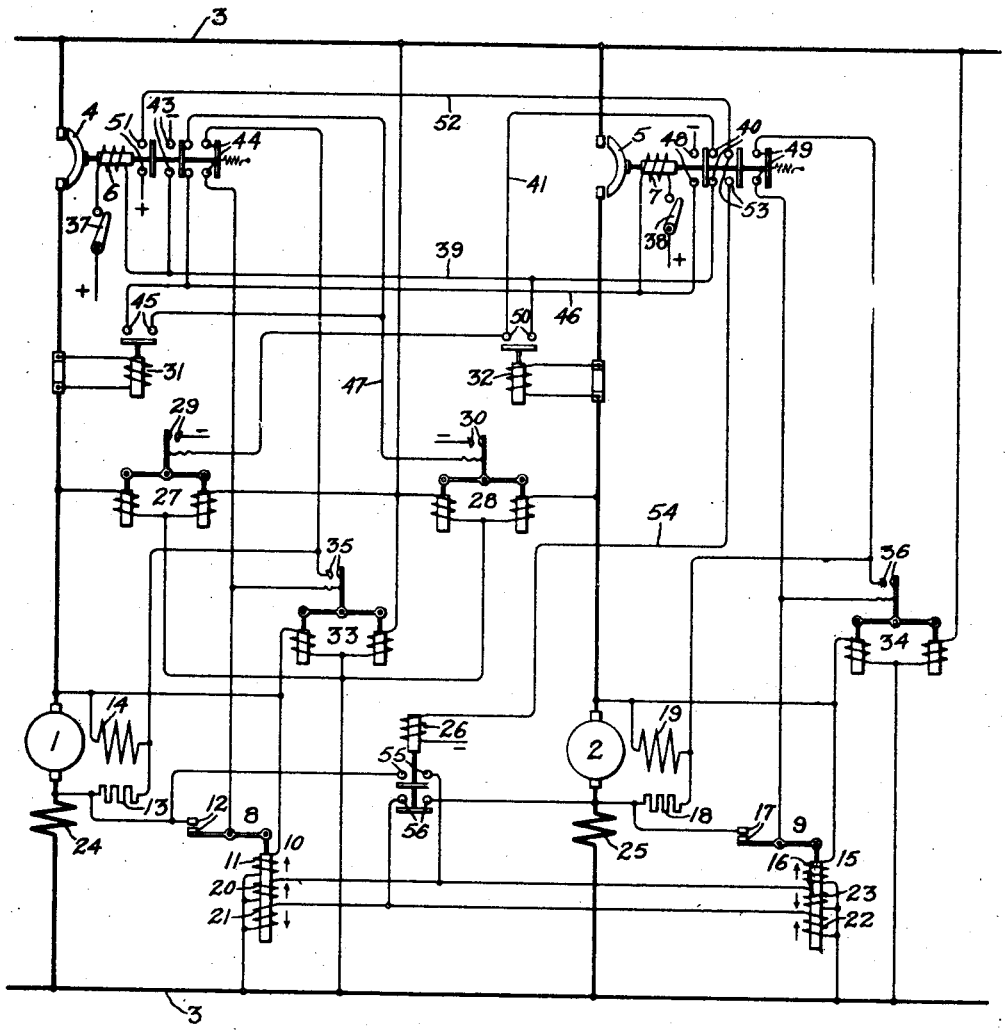
Inventor:
Herman Bany,
by
His Attorney.

Patented Aug. 20, 1929.

1,725,696

UNITED STATES PATENT OFFICE.

HERMAN BANY, OF SCOTIA, NEW YORK, ASSIGNOR TO GENERAL ELECTRIC COMPANY, A CORPORATION OF NEW YORK.

AUTOMATIC CONTROL SYSTEM.

Application filed June 2, 1927. Serial No. 196,117.

My invention relates to automatic control systems for dynamo-electric machines and particularly to systems for controlling automatically the connection of a plurality of flat compounded sources of current in parallel and for maintaining the load properly divided between the sources after they are connected in parallel.

One object of my invention is to provide a system of control for a plurality of sources of current whereby the voltage of any one of the plurality of sources, when operating alone, is maintained at a constant value for all loads and whereby the voltage of a plurality of the sources when connected in parallel is also maintained constant at the same value for all loads and a predetermined load division is maintained between them.

Another object of my invention is to provide an improved arrangement for effecting the connection of two sources in parallel.

My invention will be better understood from the following description taken in connection with the accompanying diagrammatic drawing and the scope will be pointed out in the appended claims.

In the accompanying drawing 1 and 2 represent two sources of current, shown as direct current generators, which are arranged to be connected in parallel to a common load circuit 3 by means of suitable switching devices 4 and 5 respectively which may be of any suitable type, examples of which are well known in the art. As shown, the switching devices 4 and 5 are circuit breakers of the well-known contactor type and are provided with closing coils 6 and 7 respectively.

The generators 1 and 2 are provided with suitable voltage regulators 8 and 9 respectively which may be of any suitable construction, examples of which are well-known in the art, for maintaining a flat voltage characteristic. In order to simplify the disclosure the regulating means for each generator is merely shown as a relay which is arranged to short-circuit a resistor in the shunt field of the respective generator. In actual practice, however, antihunting coils and various other control devices and auxiliaries, all of which are well-known in the art, may be used.

As shown in the drawing the regulator 8 comprises a control relay 10 which has a voltage winding 11 connected so as to be energized in response to the voltage of the generator 1. The control relay 10 is arranged to open the contacts 12 in a shunt circuit around the resistor 13 in the circuit of the shunt field winding 14 of the generator 1 when the voltage of the generator exceeds a predetermined value.

The regulator 9 comprises a similar control relay 15 which has a voltage winding 16 connected so as to be energized in response to the voltage of the generator 2. The relay 15 is arranged to open the contacts 17 in a shunt circuit around the resistor 18 in the circuit of the shunt field winding 19 of the generator 2 when the voltage of the generator 2 exceeds a predetermined value.

In order that each regulator may also control the load on its respective generator so as to maintain the proper division of the load between the generators when they are connected in parallel and at the same time maintain the voltage constant, I provide each voltage relay with two differential windings which are respectively energized in accordance with the current outputs of the two generators and which are so designed that their ampere turns are equal when the load is properly divided between the two generators. The relay 10 is provided with a winding 20 which is arranged accumulatively with respect to winding 11 and which is arranged to be energized in accordance with the current output of the generator 1. The relay 10 is also provided with a winding 21 which is arranged differentially with respect to windings 11 and 20 and which is arranged to be energized in accordance with the current output of the generator 2. The relay 15 is provided with a winding 22 which is arranged accumulatively with respect to winding 16 and which is arranged to be energized in accordance with the current output of the generator 2. The relay 15 is also provided with a winding 23 which is arranged differentially with respect to windings 16 and 22 and which is arranged to be energized in accordance with the current output of the generator 1. As shown in the drawing the windings 20 and 23 are arranged to be connected in shunt around the series commutating winding 24 of the generator 1 and the windings 21 and 22 are arranged to be connected in shunt around the series commutating winding 24 of the generator 2 by means of a relay 26 which is arranged to be operated in any suitable manner so as to effect the energization of the windings 20, 21, 22, and 23 at the proper time. In the particular arrangement shown in the drawing the relay 26 is arranged to be energized when both of the circuit breakers 4 and 5 are closed. The series commutating windings 24 and 25 are used as a convenient means of obtaining the desired energizations of the windings 20, 21, 22, and 23. Any other suitable means may be provided for accomplishing this result.

In order that reverse current may not flow through a generator at the instant it is connected to the load circuit, I provide suitable means for preventing the circuit of the closing coil of each circuit breaker from being completed unless the voltage of the respective source is equal to or greater than the voltage across the load circuit. In the particular arrangement shown in the drawing the voltage differential relays 27 and 28 control respectively the circuits of the closing coils 6 and 7. The differential relay 27 is arranged to close its contacts 29 in the circuit of the closing coil 6 when the voltage of the generator 1 is equal to or greater than the load circuit voltage. The differential relay 28 is similarly arranged to close its contacts 30 in the circuit of the closing coil 7 when the voltage of the generator 2 is equal to or greater than the load circuit voltage.

I also provide means for preventing a generator from being connected to the load circuit when the other generator is supplying current thereto if the load on said other generator is less than a predetermined amount. Such an arrangement is desirable since it is very difficult to connect two flat compound generators in parallel under light load conditions without reverse current flowing through one of them. For accomplishing this result I provide current relays 31 and 32 which are respectively energized in accordance with the current outputs of the generators 1 and 2 and which respectively control the circuits of the closing coils 7 and 6. In order that either generator may be connected to the load circuit when the other generator is not connected thereto, the circuit of the closing coil of each circuit breaker is also arranged to be completed independently of the current relays 31 and 32 by auxiliary contacts on the other circuit breaker when said other circuit breaker is open.

In order that the voltage of each generator may be maintained at a value equal to the voltage of the load circuit before it is connected to the load circuit, I provide the differential relays 33 and 34 whose contacts are connected in series with the contacts of the voltage relays 10 and 11 respectively. The differential relays 33 and 34 may be of any suitable type, examples of which are well known in the art. The relay 33 is connected and arranged so that it opens its contacts 35 and effects the connection of the resistor 13 in the circuit of the shunt field winding 14 when the voltage of the generator 1 exceeds the load circuit voltage. The relay 34 is similarly connected and arranged so that it opens its contacts 36 and effects the connection of the resistor 18 in the circuit of the shunt field winding 19 when the voltage of the generator 2 exceeds the voltage of the load circuit 3. The contacts 35 and 36 of the relays 33 and 34 are arranged to be shunted respectively by contacts on the circuit breakers 4 and 5 when they are closed.

37 and 38 are control switches which are operated when it is desired to effect the closing of the circuit breakers 4 and 5 respectively. In the drawing these switches are shown as manually operated devices, but in actual practice they may be devices which form a part of an automatic control equipment for the respective generators and may be arranged to be operated automatically at the proper time during the starting operation in a maner well-known in the art.

The operation of the arrangement shown in the drawing is as follows: It will be assumed that both generators have been started, but are not connected to the load circuit and that it is desired to connect one of them, for example generator 1, to the load circuit. The differential relays 33 and 34 respectively maintain in a manner well understood by one skilled in the art the voltages of the generators 1 and 2 equal to the voltage of the load circuit unless the load circuit voltage is too high, in which case the voltage relays 10 and 15 maintain the generator voltages at their normal values. When the switch 37 is closed to effect the closing of the circuit breaker 4 a circuit for the closing coil 6 of the circuit breaker is completed. This circuit is from one side of a suitable source of control current through switch 37, closing coil 6, conductor 39, auxiliary contacts 40 on circuit breaker 5 which is open, conductor 41, contacts 29 of relay 27 which are closed if the voltage of the generator 1 is equal to or greater than the voltage of the load circuit 3 to the other side of the source of control current.

The circuit breaker 4 by closing its auxiliary contacts 43 completes a locking circuit for the closing coil 6 which is independent of the positions of the other circuit breaker 5 and of the relay 27. The circuit breaker 4 by closing its auxiliary contacts 44 completes a shunt circuit around the contacts 35 of relay 33 so that the voltage relay 10 maintains the voltage of the generator 1 at its normal value.

As soon as the circuit breaker 4 connects the generator 1 to the load circuit the relay 31 closes its contacts 45 if the current output of the generator is above a certain amount.

When the other generator 2 is ready to be connected to the load circuit 3 and the switch 38 is closed, a circuit is completed for the closing coil 7 if the relay contacts 45 are closed and the voltage of the generator 2 is not less than the load circuit voltage. The circuit of the closing coil 7 is from one side of a suitable control source through switch 38, closing coil 7, conductor 46, contacts 45 of relay 31, conductor 47, contacts 30 of relay 28 to the other side of the control source.

The circuit breaker 5 by closing its auxiliary contacts 48 completes a locking circuit for the closing coil 7 which is independent of the positions of the other circuit breaker 4 and of the relay 28. The circuit breaker 5 by closing its auxiliary contacts 49 completes a shunt circuit around the contacts 36 of relay 34 so that the voltage relay 15 maintains the voltage of the generator at its normal value. If the current output from the generator 2 exceeds a predetermined amount after the generator 2 is connected to the load circuit, the relay 32 closes its contacts 50.

As soon as both circuit breakers 4 and 5 are closed a circuit is completed for the relay 26 to effect the energization of the coils 20, 21, 22, and 23 on the regulators 8 and 9. The circuit of the relay 26 is from one side of a suitable control source, through auxiliary contacts 51 on circuit breaker 4, conductor 52, auxiliary contacts 53 on circuit breaker 5, conductor 54, coil of relay 26 to the other side of the control source. The relay 26 by closing its contacts 55 connects the windings 20 and 23 in shunt to the series field winding 24 and by closing its contacts 56 connects the windings 21 and 22 in shunt to the series field winding 25.

The windings 20, 21, 22, and 23 are arranged so that the ampere turns of the windings 20 and 21 are equal and opposite and the ampere turns of the windings 22 and 23 are equal and opposite so long as the load divides in the desired manner between the two generators. Since the effect of the two current coils on each regulator is zero at balanced loads, the voltages of the generators are held at a constant value for all loads.

If the current output of the generator 1 is too great relatively to the current output of the generator 2, the ampere turns of the windings 20 and 23 are greater than the ampere turns of the windings 21 and 22 respectively. Since winding 20 acts accumulatively with respect to voltage winding 11 whereas winding 23 acts differentially with respect to voltage winding 16, the regulator 8 tends to hold a lower voltage and thereby decrease the load on the generator 1 whereas the regulator 9 tends to hold a higher voltage and thereby increase the load on the generator 2 so as to restore the proper load division between the generators. It is obvious that a similar action occurs to cause the regulator 8 to tend to hold a higher voltage and the regulator 9 to tend to hold a lower voltage when the current output of the generator 2 is too great relatively to the current output of the generator 1.

It is also obvious that the arrangement operates in a similar manner to maintain the voltage across the load circuit constant when the generator 2 is the first to be connected to the load circuit and to maintain the load properly divided between the generators 1 and 2 when the generator 1 is subsequently connected in parallel with the generator 2.

While I have in accordance with the patent statutes shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, a plurality of parallel connected sources of current, and means for maintaining a predetermined voltage across one of said sources and for maintaining a predetermined division of load between said sources comprising a voltage regulator for said one of said sources comprising a regulating relay having three inductively connected coils including a voltage coil connected so as to be responsive to the voltage of said one of said sources, another coil arranged accumulatively with respect to said voltage coil and connected so as to be responsive to the amount of current supplied by said one of said sources and another coil arranged differentially with respect to said voltage coil and connected so as to be responsive to the current supplied by another of said sources.

2. In combination, two parallel connected generators, and a voltage regulator for each generator, each comprising a regulating relay having a voltage coil connected so as to be responsive to the voltage of the respective generator, another coil arranged accumulatively with respect to the voltage coil and connected so as to be responsive to the amount of current supplied by the respective generator, and another coil arranged differentially with respect to the voltage coil and connected so as to be responsive to the current supplied by the other generator.

3. In combination, a load circuit, two sources of current adapted to be connected to said circuit, a voltage regulator for one of said sources comprising a regulating relay having a voltage coil and two differentially wound current coils, and means responsive to a predetermined condition of both of said sources for effecting the connection of said current coils to said sources so that they are respectively energized in accordance with the current outputs of said sources.

4. In combination, a load circuit, two generators, means for connecting each generator to said load circuit, a voltage regulator for each generator comprising a regulating relay having a voltage coil and two differentially wound current coils, and means responsive to the connection of both of said generators to said load circuit for connecting one of the current coils of each relay in series relation with one of said generators and for connecting the other current coil of each relay in series relation with the other generator.

5. In combination, a load circuit, two sources of current adapted to be connected to said circuit, means associated with each source and responsive to the relative voltages of the associated source and the load circuit for effecting the connection of the associated source to the load circuit, and means for controlling each connecting means controlled by the connecting means and the current output of the other source whereby the operation of a connecting means is independent of the current of the other source when said other source is not connected to the load circuit and depends upon the amount of current supplied by said other source when it is connected to the load circuit.

6. In combination, a load circuit, a plurality of sources of current adapted to be connected to said load circuit, means for maintaining the voltage of a source equal to the load circuit voltage when the source is disconnected from the load circuit, and means for effecting the connection of a source to the load circuit when the voltage of the source is at least equal to the load circuit voltage and both when another of said sources is not connected to the load circuit and when it is supplying a predetermined amount of current thereto.

7. In combination, a load circuit, two sources of current adapted to be connected to said load circuit, switching means for connecting one of said sources to said load circuit, a control circuit therefor, contacts in said control circuit arranged to be closed when the voltage of the associated source is equal to or greater than the load circuit voltage, other contacts in said control circuit arranged to be closed when the current output of the other source is above a predetermined value, and other contacts connected in parallel with said second mentioned contacts and arranged to be closed only when the other source is not connected to said load circuit.

8. In combination, a load circuit, two sources of current, control means for effecting the connection of said sources to said load circuit, a voltage regulator for one of said sources comprising a voltage winding and two differential current windings adapted to be energized respectively in accordance with the current outputs of said sources, and means responsive to a predetermined condition of said control means for controlling the circuits of said current windings.

9. In combination, a load circuit, two sources of current, control means for effecting the connection of said sources to said load circuit, a voltage regulator for each source comprising a voltage winding energized in accordance with the voltage of the respective source and two differential current windings connected and arranged so that their ampere turns are equal when the current outputs of the two sources bear a predetermined relation to each other, and means responsive to a predetermined condition of said control means for completing the circuits of said current winding of both of said regulators.

10. In combination, a load circuit, two sources of current and a regulator associated with one of said sources arranged to maintain the voltage thereof constant for all loads both when the source is supplying current to the load circuit alone and when it is supplying current thereto in parallel with the other source and to maintain a predetermined division of load between the sources when they are operating in parallel.

11. In combination, a load circuit, two sources of current, switching means for connecting each source to said load circuit, means for effecting the operation of each switching means when the voltage of the associated source is at least as high as the load circuit voltage and the other source is either not connected to the load circuit or it is connected thereto and the current output thereof is above a predetermined value, and a regulator associated with each source arranged to maintain the voltage thereof constant for all current outputs both when the source is supplying current to the load circuit alone and when it is supplying current thereto in parallel with the other source and to maintain a predetermined division of load between the sources when they are supplying current thereto in parallel.

12. In combination, a load circuit, a source of current, switching means for connecting said source to said load circuit, a regulator for said source comprising a control circuit having series connected contacts respectively controlled in accordance with the voltage of said source and the relative voltages of said source and load circuit, and means controlled by said switching means for short-circuiting the contacts which are controlled in accordance with the relative voltages when said source is connected to said load circuit.

13. In combination, a load circuit, a source of current, switching means for connecting said source to said load circuit, a regulator for said source comprising a control circuit having a plurality of contacts connected in series, a relay responsive to the voltage of said source for controlling certain of said contacts, a relay responsive to the relative voltages of said source and load circuit for controlling other of said contacts, and contacts controlled by the position of said switching means for controlling a short circuit around said other of said contacts.

In witness whereof, I have hereunto set my hand this 1st day of June, 1927.

HERMAN BANY.